United States Patent [19]
Fowler

[11] 3,948,437
[45] Apr. 6, 1976

[54] AUTOMATED PELORUS SYSTEM
[75] Inventor: John T. Fowler, Winthrop, Mass.
[73] Assignee: The Laitram Corporation, New Orleans, La.
[22] Filed: Aug. 8, 1974
[21] Appl. No.: 495,836

[52] U.S. Cl.......... 235/150.2; 235/150.26; 73/178 R
[51] Int. Cl.² .......................................... G06G 7/78
[58] Field of Search ............. 33/352, 354, 275, 363; 73/178 R; 340/347 P, 347 SY, 347 AD; 235/150.2, 150.26, 150.27; 318/586, 603

[56] References Cited
UNITED STATES PATENTS

| | | | |
|---|---|---|---|
| 3,096,503 | 7/1963 | Iddings | 340/26 |
| 3,119,189 | 1/1964 | Hyne | 33/222 |
| 3,160,878 | 12/1964 | Galloway | 343/5 |
| 3,453,653 | 7/1969 | Pope | 73/178 |
| 3,490,153 | 1/1970 | Harris | 33/215 |
| 3,746,842 | 7/1973 | Fowler | 235/92 CV |
| 3,791,043 | 2/1974 | Russell | 33/312 |

Primary Examiner—Charles D. Miller
Attorney, Agent, or Firm—Weingarten, Maxham & Schurgin

[57] ABSTRACT

A pelorus system for automatically providing an output display of the magnetic bearing of sighted objects. A pelorus sight is coupled to a shaft encoder which provides output pulses representative of the relative angular bearing of a sighted object. Pulses are also provided by a digital magnetic compass and representative of magnetic heading. The pulses from the pelorus encoder and from the digital compass are processed to provide an output indication of magnetic bearing of a sighted object.

6 Claims, 2 Drawing Figures

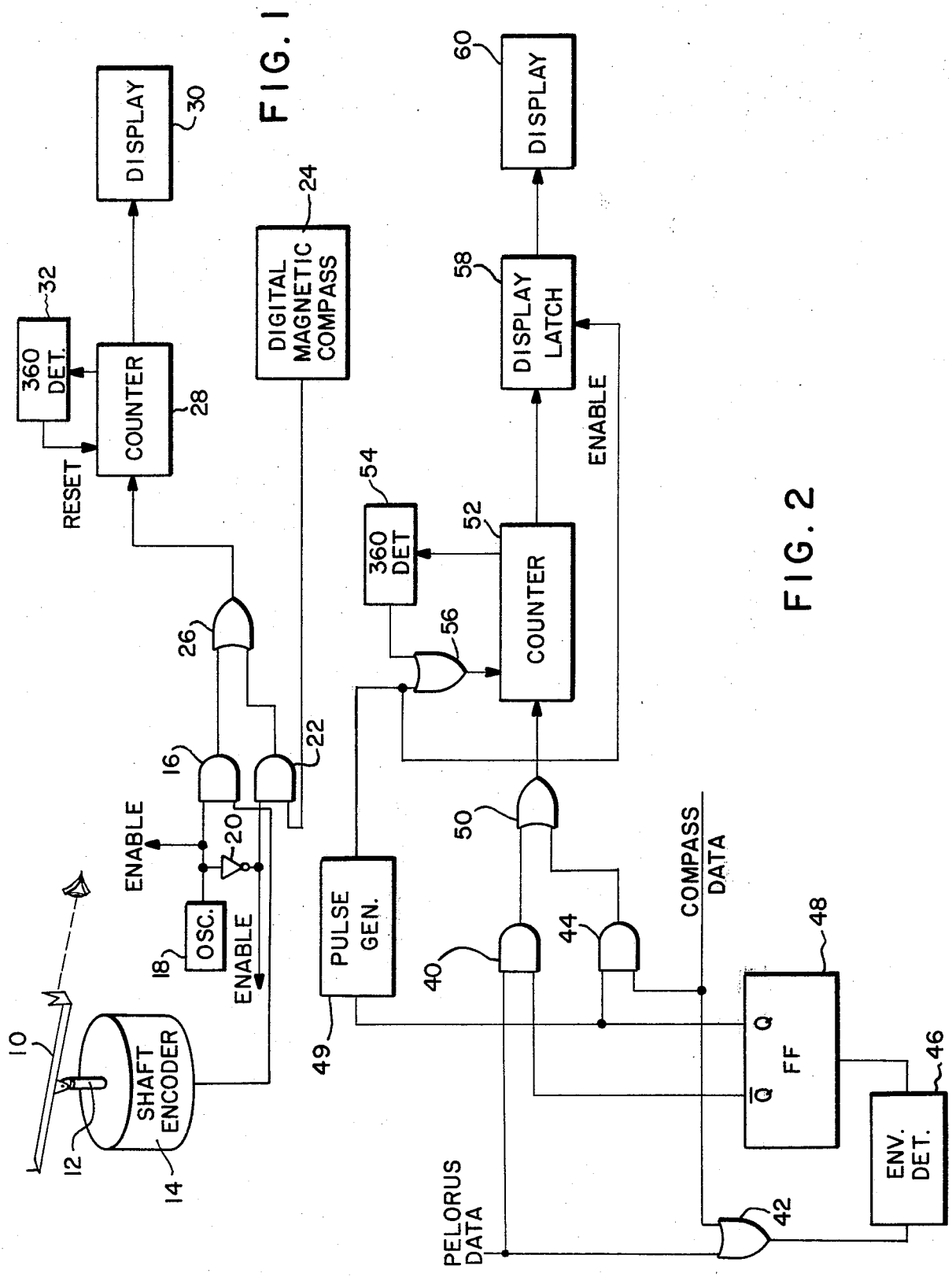

AUTOMATED PELORUS SYSTEM

FIELD OF THE INVENTION

This invention relates to navigation apparatus and more particularly to a pelorus system providing a numerical output representation of the magnetic bearing of sighted objects.

BACKGROUND OF THE INVENTION

The pelorus is a well known navigation instrument for taking the bearing of a sighted object. A relative bearing can be determined with respect to the fore - aft axis of the vessel aboard which the instrument is employed, or pelorus bearing can be provided in conjunction with compass heading to provide a magnetic bearing indication. In order to provide a magnetic bearing of a sighted object by use of conventional instruments, the pelorus and compass readings should be simultaneously made for accurate bearing determination and can require the presence of two individuals for noting the respective bearing and compass heading. A subsequent computation is then required to provide the intended magnetic bearing.

SUMMARY OF THE INVENTION

In accordance with the present invention, an automated pelorus system is provided for directly producing a numerical output indication of the magnetic bearing of sighted objects. A pelorus sight is attached to and rotatable with a rotary shaft encoder operative to provide output pulses representative of relative bearing. A digital magnetic compass provides output pulses representative of compass heading and these pulses are processed in association with the pelorus encoder pulses to provide an output indication of magnetic bearing. The invention can also be employed for providing an output indication of relative pelorus bearing.

DESCRIPTION OF THE DRAWINGS

The invention will be more fully understood from the following detailed description taken in conjunction with the accompanying drawings in which:

FIG. 1 is a schematic representation of a pelorus system embodying the invention; and FIG. 2 is a schematic representation of an alternative embodiment of the logic circuitry of the invention.

DETAILED DESCRIPTION OF THE INVENTION

Referring to FIG. 1, there is shown a pelorus sight 10 affixed to and rotatable with the shaft 12 of a shaft encoder 14. The pelorus sight is rotatable in azimuth to sight an object, the bearing of which is to be determined, and encoder 14 is operative to provide pulses representative of the angular position of sight 10 with respect to a reference axis, usually the lubber line of the vessel aboard which the system is employed. The pulse signals from encoder 14 are applied to one input of an AND gate 16, a second input being provided by a clock oscillator 18. The oscillator also provides clock signals via an inverter 20 to an input of a second AND gate 22, the other input of which is provided by a digital magnetic compass 24. The compass 24 provides a pulse signal representative of compass heading, the compass itself being preferably of the type shown in copending United States patent application Ser. No. 284,362, now U.S. Pat. No. 3,833,901, filed Aug. 28, 1972, assigned to the assignee of this invention. The outputs of respective AND gates 16 and 22 are coupled to respective inputs of an OR gate 26, the output of which is applied to a counter 28 which, in turn, provides an output signal for display 30. A detection circuit 32 is coupled to counter 28 and is operative to provide a reset signal thereto in response to detection of an output count representative of 360°. Enable signals are provided by oscillator 18 and by inverter 20 for respective enablement of encoder 14 and compass 24 to provide output pulses therefrom in an adjacent time sequence.

In operation, an output pulse train from encoder 14 representative of an angular position of pelorus sight 10 is applied to gate 16, upon command by the oscillator enable output, and is clocked through gate 16 by the clock signal from oscillator 18 to provide an output pulse train conveyed via OR gate 26 to counter 28 which increments to a count representative of the angular position of the pelorus. A pulse train representative of magnetic compass heading is applied to gate 22, upon command by the inverter enable output, and is clocked through gate 22 in response to the clock signal from oscillator 18, the output pulses from gate 22 being applied via OR gate 26 to counter 28. The counter also increments in response to the pulses received from the digital compass and thus provides a final count which is the sum of the pulses received from the pelorus and the digital compass. This final count is provided to display 30 for providing an output indication of the magnetic bearing of the object sighted by the pelorus.

In the event that the sum of the pulses received from the digital compass and from the pelorus encoder exceed 360°, the counter 28 is reset by operation of detector circuit 32 to provide a final count which is equal to the difference of the summed count less the count representative of 360°. As an example, assume that a magnetic heading of 270° is provided by digital compass 24, and that a relative bearing of 180° is provided by pelorus encoder 14. Counter 28 will provide an output count representing 450°; however, by operation of detector circuit 32, a count representing 360° is subtracted from this sum to provide an output count representative of a 90° magnetic bearing which is displayed by display 30.

It will be appreciated that the signal indication of pelorus bearing should be processed in the embodiment of FIG. 1 in a time frame distinct from the time frame for the signal provided by digital compass 24. In the above-described embodiment, the relative timing is governed by the enable signals which operate as commands to encoder 14 and digital compass 24 for the provision of respective output signals therefrom.

An alternative embodiment of the invention is shown in FIG. 2. Data representative of pelorus bearing is provided to one input of an AND gate 40 and to one input of an OR gate 42. Data representative of compass heading is applied to one input of an AND gate 44 and to the other input of OR gate 42. The output of gate 42 is applied to an envelope detector 46, the output of which is applied to the trigger input of a flip-flop 48, the outputs of which are respectively applied to inputs of gates 40 and 44. The output of AND gates 40 and 44 are applied to an OR gate 50, the output of which is applied to a counter 52. A detector circuit 54 is coupled to an output of counter 52 and is operative to provide a reset signal via an OR gate 56 to the counter. A reset signal is also provided via OR gate 56 from the Q output of flip-flop 48 via a pulse generator 49. Counter 52 provides an output signal to a display latch 58, the output of which drives a display 60. The latch is enabled by the signal from pulse generator 49 and is enabled prior to counter resetting.

Considering the operation of the embodiment of FIG. 2, data from the pelorus is applied via OR gate 42 to envelope detector 46 which provides an output gate signal of a duration at least equal to the duration of the pulse train representing the pelorus data. Flip-flop 48 in response to the gate signal from envelope detector 46 provides a $\bar{Q}$ output to AND gate 40 as an enabling signal therefor to permit conveyance of the pelorus data pulses to OR gate 50 and thence to counter 52 which increments to a count representative of the pelorus bearing. Upon termination of the gate signal from envelope detector 46, flip-flop 48 provides a Q output signal to AND gate 44 to permit compass data to be conveyed via OR gate 50 to counter 52. The counter as before thus increments to a count equal to the sum of the counts representing pelorus bearing and digital compass heading. In the event that the summed count is greater than 360°, the counter is reset upon detection of a 360° count by operation of circuit 54 to effectively subtract 360° and provide an output count representative of magnetic bearing of the object sighted by the pelorus. The output count from counter 52 is applied to a latch circuit 58 and thence to display 60 for visual indication thereof.

The invention is not to be limited to what has been particularly shown and described except as indicated in the appended claims.

What is claimed is:

1. A pelorus system comprising:
   a pelorus arranged for the visual sighting of objects in an azimuth plane;
   encoder means coupled to said pelorus and operative to provide a digital signal representative of pelorus bearing;
   a digital magnetic compass operative to provide a digital signal representative of magnetic compass bearing;
   counter means;
   gate means operative to convey said encoder signal and said magnetic compass signal to said counter means;
   said counter means being operative to provide an output count representative of the magnetic bearing of an object sighted by said pelorus; and
   display means for providing an output indication of said magnetic bearing.

2. The system according to claim 1 wherein said gate means includes:
   first and second AND gates each receiving a respective signal from said encoder means and digital magnetic compass;
   clock means for providing clock signals in timed sequence to said first and second AND gates;
   an OR gate operative to couple the output signals from each of said AND gates to the input of said counter means.

3. The system according to claim 1 wherein said counter means includes:
   a detector circuit coupled to an output of said counter means and operative in response to a count representative of 360° to reset said counter means.

4. The system according to claim 1 wherein said gate means includes:
   first and second AND gates each operative to receive respective signals from said encoder means and said digital magnetic compass;
   envelope detector means operative in response to each of said respective signals from said encoder means and said digital magnetic compass to provide a gate signal of a duration representative of the duration of said respective signals;
   flip-flop means operative in response to said gate signal to provide first and second enabling signals to respective ones of said AND gates;
   an OR gate operative to convey each of the output signals from said AND gates to the input of said counter means.

5. A pelorus system comprising:
   a pelorus including a sight rotatable in azimuth for the visual sighting of objects in an azimuth plane;
   shaft encoder means coupled to said pelorus and operative at any rotatable position of said pelorus to provide output pulses of a number representative of pelorus bearing;
   a digital magnetic compass operative to provide output pulses of a number representative of compass bearing;
   counter means incrementable in response to pulses applied thereto;
   gate means operative to convey said encoder pulses and said magnetic compass pulses to said counter means in a timed sequence;
   said counter means being operative to provide an output count representative of the magnetic bearing of an object sighted by said pelorus; and
   display means operative in response to said output count to provide an output indication of said magnetic bearing.

6. The system according to claim 5 wherein said counter means includes:
   a detector circuit operative in response to an output count representative of 360° to reset said counter means to thereby effectively subtract 360° from a magnetic bearing greater than 360°.

* * * * *